Figure 1:
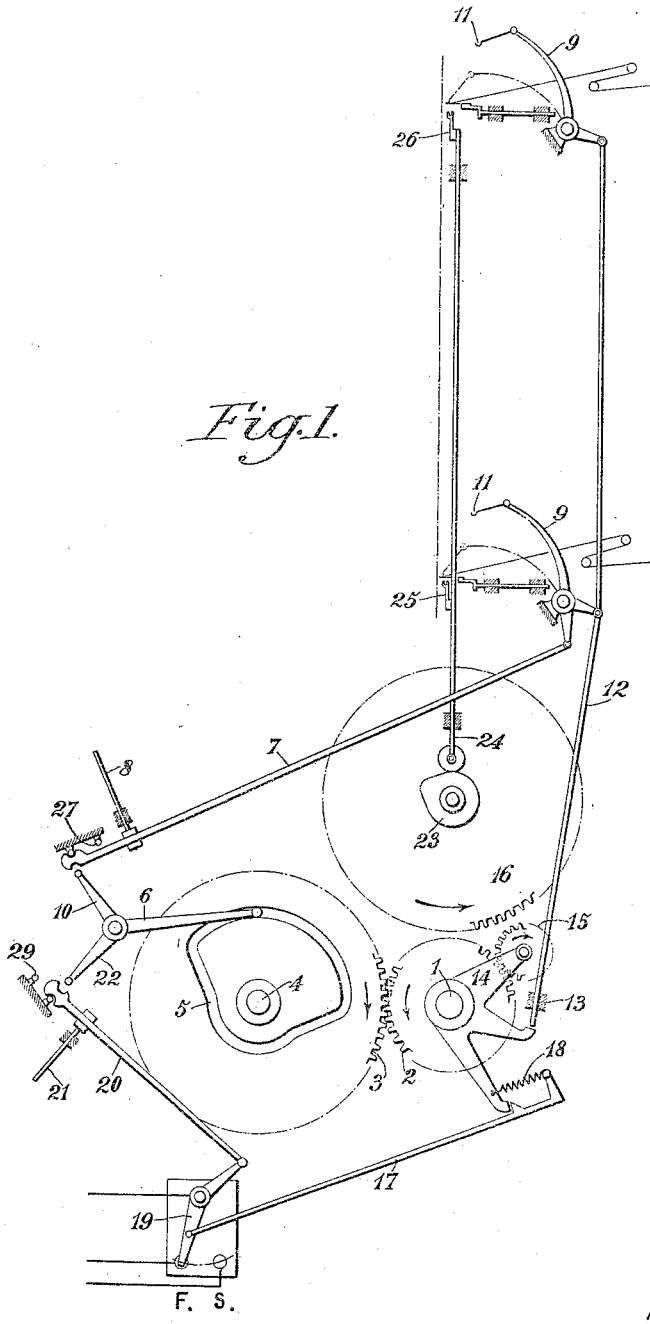

R. ZAHN.
JACQUARD EMBROIDERING MACHINE.
APPLICATION FILED MAR. 18, 1910.

995,395.

Patented June 13, 1911.

2 SHEETS—SHEET 1.

WITNESSES:
René Bruine
William F. Martinez

INVENTOR:
Robert Zahn,
By Attorneys,

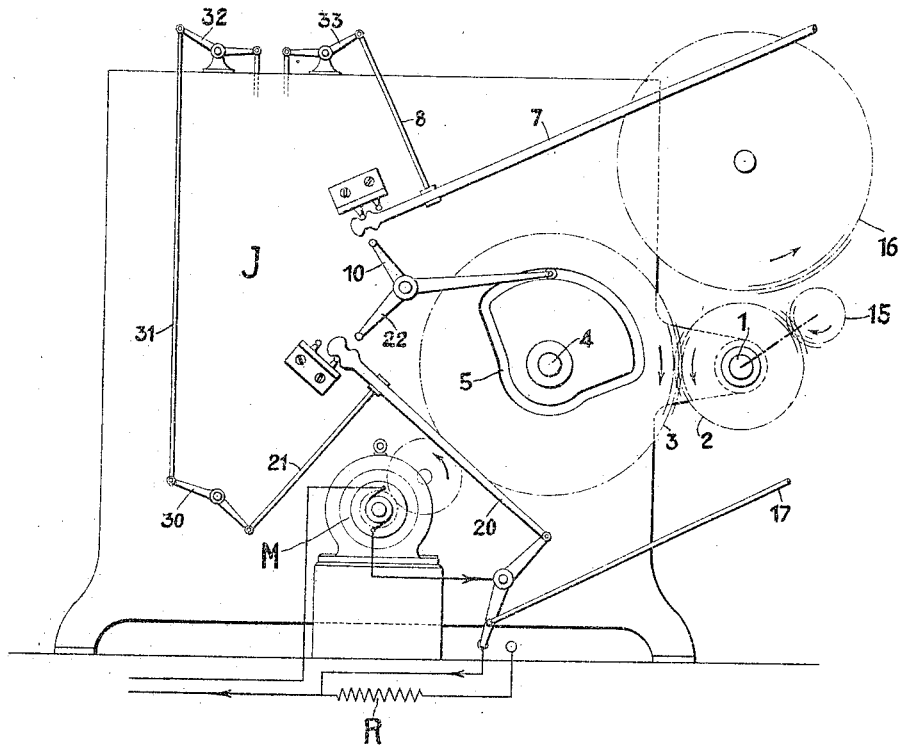

UNITED STATES PATENT OFFICE.

ROBERT ZAHN, OF PLAUEN, GERMANY.

JACQUARD EMBROIDERING-MACHINE.

995,395.

Specification of Letters Patent. Patented June 13, 1911.

Application filed March 18, 1910. Serial No. 550,181.

*To all whom it may concern:*

Be it known that I, ROBERT ZAHN, a subject of the King of Bavaria, and resident of Plauen, Germany, have invented new and useful Improvements in Jacquard Embroidering-Machines, of which the following is a full, clear, and exact specification.

The present invention relates to improvements in jacquard embroidering machines with scallop mechanism, speed change means and cord laying device, said improvements consisting of an arrangement wherein the cord laying device is controlled by a needle of the jacquard mechanism and controls itself, in conjunction with the speed change means, a throwing-in device of the scallop mechanism, so that when the machine is set at slow speed the movement of the cord laying device also determines the throwing-into-operation of the scallop mechanism. Owing to this connection between the scallop mechanism and the cord laying device, the machine is simplified, as only one jacquard needle is used for controlling two functions.

The accompanying diagrammatic drawings show one method of carrying out the present invention.

Figure 1 is a general view of the arrangement, while Fig. 2 represents the motive and jacquard controlled devices of the machine.

The main shaft 1 of the machine is driven at half the speed of the jacquard shaft 4 by means of a pair of toothed wheels 2, 3, so that the shaft 1 revolves twice for every revolution of the shaft 4. The toothed wheel 3 is provided with a cam groove 5 which controls a three-armed driving lever 6 and of which during one revolution of the shaft 1 one of the two operative portions of the cam groove comes into action, while during the following revolution of this shaft the other operative portion of the cam groove is brought into action.

A movable adjusting rod 7 controlled by a needle of the jacquard mechanism J (Fig. 2) by means of a lever 33 and a lifter link 8 can be coupled to the arm 10 of the lever 6. This adjusting rod 7 actuates the cord laying levers 9 which are arranged in pairs and are provided with cord positioning fingers 11. A locking rod 12 connected to the cord laying levers 9 passes through a guide 13 and terminates opposite an arm of the three-armed rocking lever 14 which is loose on the shaft 1 and is designed to operate the throwing-into-operation of the scallop mechanism. The second arm of this lever carries a coupling wheel 15 which is in constant engagement with the toothed wheel 2 and which can also be brought into engagement with the driving wheel 16 of the scallop mechanism when the lever 14 is rocked in one direction; normally, however, the coupling wheel 15 is out of engagement with the wheel 16 and rotates loose about its own axis.

The third arm of the rocking lever 14 is controlled by a stopping rod 17 which is connected at one end to the said arm of the lever 14 by means of a tension spring 18, and at the other end to a lever 19 controlling the speed of the machine. The speed controlling lever 19 is arranged, as a switch lever for an electromotor M (Fig. 2) driving the wheel 3 of the jacquard embroidering machine and which may be switched on to either of two different speeds, the position shown in the drawing (F)—fast—being for the fast drive of the machine whereby a resistance R for example is cut off from the electric supply circuit. The switch lever 19 is connected to an adjusting rod 20 which may be coupled to the arm 22 of the lever 6 by means of a lifter 21 controlled through lever 30, rod 31 and lever 32 from a needle of the jacquard mechanism J (Fig. 2). The shaft of the wheel 16 is provided with a cam 23 which actuates the operating rod 24 of the scallop hooks 25, 26.

The mode of operation of the arrangement described is as follows: If it is desired to lay the cord tensioned between the levers 9 of each pair, on the material which is being worked upon, then the adjusting rod 7 is coupled with the arm 10 of the lever 6 by means of the respective jacquard needle. The rod 7 is then thrust upward owing to the action of the one operative part of the cam groove 5 and the rod 7, by means of the levers 9, brings the cord lying in the fingers 11, before the corresponding row of embroidery needles. At the same time the locking rod 12 is raised so that the throwing-into-operation lever 14 of the scallop mechanism is released. The lifter 8 is now drawn back by means of the jacquard needle connected to it, and thereby brings the adjusting rod 7 into engagement with a fixed pin 27. After the cord is firmly embroidered in position, this jacquard needle again comes into action and operates in such a manner that the levers and rods belonging to it, now under the control of the other operative portion of the cam groove 5, are brought back into their initial position.

If it is desired to drive the parts of the machine positioned as shown in the drawing, at the slow speed, the cord laying device remains at rest so that the rod 12 locks the lever 14 in its inoperative position. The adjusting rod 20 is then coupled to the arm 22 of the driving lever 6 by means of the jacquard needle connected to the lifter 21. This results in that the rod 20 is pushed upward by virtue of the first operative portion of the cam groove 5 so that the switch lever 19 is moved over to (S)—slow—and at the same time the stopping rod 17 is pushed to the right and the spring 18 connected with the locked lever 14 is tensioned. Then, the rod 21 is pulled back by means of the jacquard needle connected to it, so that the adjusting rod 20 is coupled to a fixed pin 29. In order to again set the machine at the fast speed, this jacquard needle is again brought into operation. The levers and rods which are now controlled by the second operative portion of the cam groove 5 are therefore then brought back into their initial position. As may be seen, the machine may also be set at the slow speed without operating the throwing-into-operation lever 14 of the scallop mechanism.

If scalloping is required to be done, the machine must be previously set to run at the slow speed. The rod 17, as mentioned above, will then be pushed over to the right and the spring 18 thereby tensioned. The cord laying device will then be brought into action by means of its corresponding jacquard needle in the manner previously described, without however having a cord suspended in the fingers 11. Owing to the movement of the cord laying device, the locking rod 12 is brought out of engagement with the corresponding arm of the rocking lever 14. The tension spring 18 will thus turn the lever 14 to such an extent that the coupling wheel 15 engages with the driving wheel 16 of the scallop mechanism. The scallop mechanism 24, 25, 26 is thereby set into operation. When the scallop stitches have been made, the cord laying device will be brought back in the manner above set forth, and the rod 12 connected thereto acts on the lever 14 in such a manner that the coupling wheel 15 will be disengaged from the wheel 16 and the scallop mechanism will be brought to rest.

What I claim is:

1. In jacquard embroidering machines, the combination of a needle mechanism, a jacquard mechanism, a scallop mechanism, a device for the throwing-into-operation of said scallop mechanism, means for changing the speed of the machine, a cord laying device, means for actuating said cord laying device under the control of said jacquard mechanism, interconnecting means between said speed changing means and said throwing-into-operation device and interconnecting means between said throwing-into-operation device and the cord laying device, both said interconnecting means being so arranged that when the machine is set at slow speed the movement of the cord laying device also determines the throwing-into-operation of the scallop mechanism.

2. In jacquard embroidering machines, the combination of a needle mechanism, a jacquard mechanism, a scallop mechanism, a device for the throwing-into-operation of said scallop mechanism, means for changing the speed of the machine under the control of the jacquard mechanism, a cord laying device, means for actuating said cord laying device under the control of the jacquard mechanism, combined interconnecting elastic means between said speed changing means and said throwing-into-operation device and interlocking means between said throwing-into-operation device and the cord laying device, said interconnecting and interlocking means being so arranged that when the machine is set at slow speed the movement of the cord laying device also determines the throwing-into-operation of the scallop mechanism.

3. In jacquard embroidering machines, the combination of a needle mechanism, a jacquard mechanism, a scallop mechanism, a movable lever for the throwing-into-operation of said scallop mechanism, means for changing the speed of the machine under the control of the jacquard mechanism, a cord laying device, means for actuating said cord laying device under the control of the jacquard mechanism, a stopping member for said throwing-into-operation lever, connected with the speed changing means, a spring connection between said stopping member and said throwing-into-operation lever and an interlocking member connected to the cord laying device and arranged to normally lock said throwing-into-operation lever in its inoperative position, but to unlock it when the cord laying device is actuated, for the purposes set forth.

4. In jacquard embroidering machines, the combination of a needle mechanism, a jacquard mechanism, a scallop mechanism, a device for the throwing-into-operation of said scallop mechanism, means for changing the speed of the machine, a cord laying device, means for actuating said cord laying device under the control of the jacquard mechanism, interlocking means between the cord laying device and said throwing-into-operation device and an elastic connection between the speed changing means and said throwing-into-operation device, whereby the
5 machine may be set at slow speed without operating the throwing-into-operation device for the scallop mechanism.

In witness whereof I have hereunto signed my name this 21st day of February 1910, in the presence of two subscribing witnesses.

ROBERT ZAHN.

Witnesses:
 ROBERT H. NIER,
 RICHARD B. WASHINGTON.